Sept. 25, 1945.  J. S. W. DAVIDSEN  2,385,351
CONTROL SYSTEM FOR HYDRAULICALLY ACTUATED DEVICES
Filed June 23, 1942  2 Sheets-Sheet 2

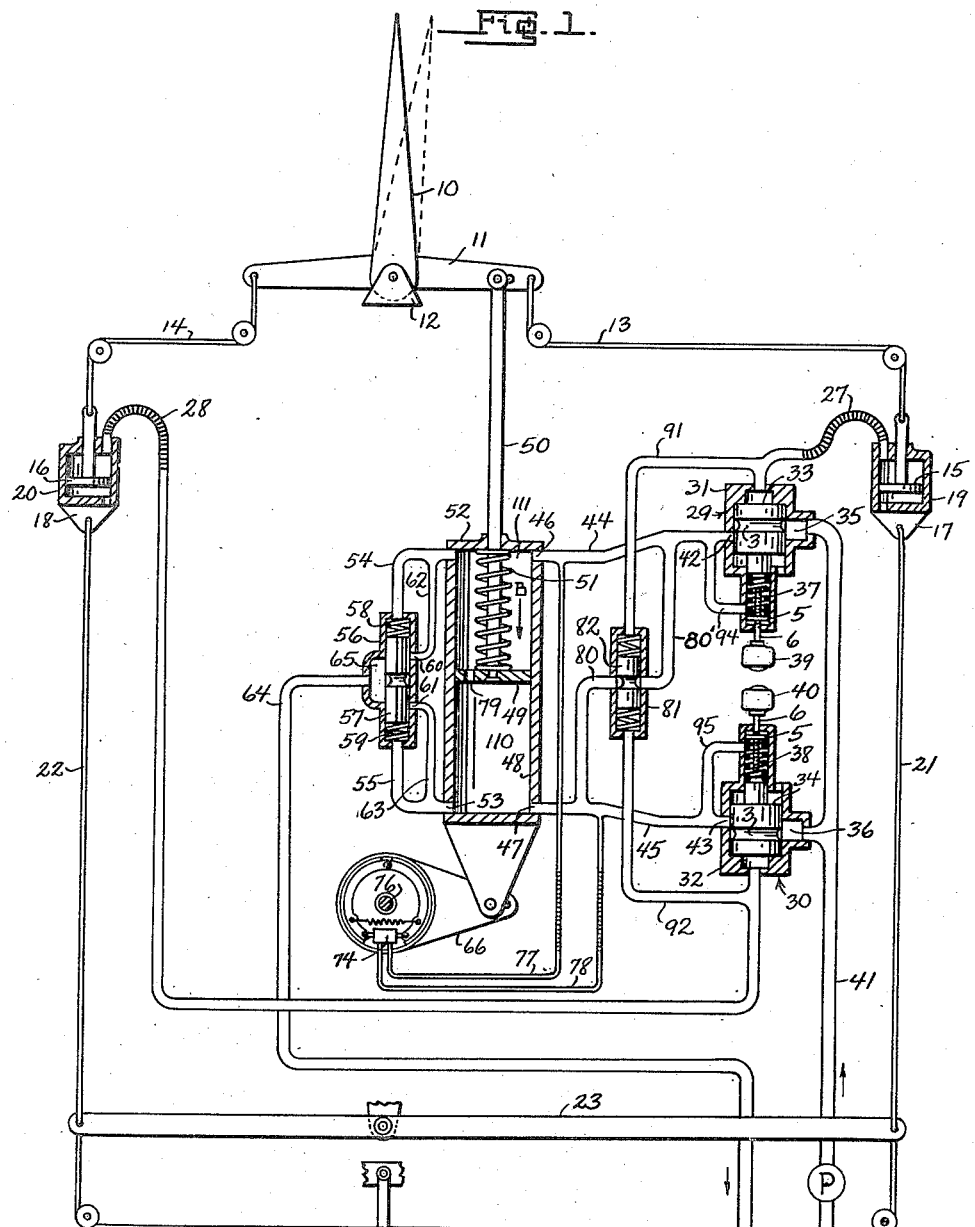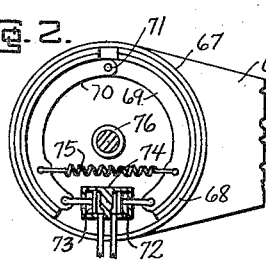

INVENTOR
J. S. W. Davidsen
BY
ATTORNEY

Patented Sept. 25, 1945

2,385,351

UNITED STATES PATENT OFFICE 2,385,351

CONTROL SYSTEM FOR HYDRAULICALLY ACTUATED DEVICES

Jess S. W. Davidsen, Mountain View, Calif.

Application June 23, 1942, Serial No. 448,163

18 Claims. (Cl. 244—85)

(Granted under the act of March 3, 1883, as amended April 30, 1928; 370 O. G. 757)

This application is a continuation in part of my co-pending application, Serial No. 417,433, filed November 1, 1941.

The invention hereinafter set forth relates generally to hydraulic power systems and more particularly to systems for controlling the flow of fluid to a servo-motor which is used to govern the boosting force required to position certain structural members, particularly the control surfaces of aircraft or the rudders of ships. This invention, as illustrated, is applied particularly to the art of aircraft control wherein the hydraulic system disclosed supplies a boosting force which assists the pilot in positioning the control surface of the aircraft in order that the muscular effort required of the pilot will be reduced.

Recent advances which have been made in the arts relating to aerodynamics have enabled the designers to increase the size and operating speed of the modern aircraft to such an extent that it now becomes exceedingly desirable to provide a safe and satisfactorily operating control system which will reduce the muscular effort required for control. In attempting to satisfy the existing need for such a control system, I prefer to employ a servo-motor preferably of the hydraulic type for producing the assisting force; rather than rely upon the utilization of those systems which offer a pure mechanical advantage for amplifying the pilot's manual effort. The system I employ, however, has the favorable feature of those systems operating on pure mechanical advantage in the respect that the muscular effort of the operator is transmitted directly to the control surface. The booster system which offers the assisting or boosting force is controlled or governed by the application of this manual force to said control surface, and the reaction of the control surface to the booster and manual forces acting thereon is transmitted directly to the operator in a reduced ratio with a high degree of fidelity.

In developing such a control system certain inherent disadvantages which have been encountered in the use of the unassisted control force, pilot fatigue, and the like, must also be taken into consideration if they are to be avoided in the design of a control system for supplying a booster control force. For example, in large aircraft, the distance from the pilot's control station to the control surfaces which are operated therefrom is extensive, consequently exceedingly long cables must be used. These cables acquire an excessive elongation when subjected to the tensional force necessary to produce movement of these control surfaces. This elongation is undesirable since it causes the pilot to sense a lag in control surface response. If the stretch or elongation of the cable transmission is to be prevented in a system offering pure mechanical advantage, the size and weight of the cables must be increased and may become excessive. Furthermore, the expansion which occurs throughout the total length of this control cable as a result of the changes in temperature usually encountered in the high altitude aircrafts, must also be considered in determining the initial tension applied to these control cables. Otherwise, an excessive elongation may be present in which event movement of the control column by the pilot would result only in taking up the slack produced in the cable by its elongation. That is, as the altitude increases, the temperature decreases, producing a contraction in all parts of the aircraft. The steel control cables actually shrink in length with a decrease in temperature, but the aluminum fuselage shrinks or contracts much more than does the steel cable for the same decrease in temperature. Hence, the original "rigging tension" applied to these steel cables becomes less at high altitudes and low temperatures. In order to prevent the elongation of the cable produced by differences in contraction from producing excessive lagging in control response, the cables must be installed with an extremely high initial tension. This increase in initial tension causes also an increase in cable size and an attendant undesirable increase in weight. Furthermore, high friction also accompanies high control forces and the friction encountered tends to produce further lag in "control response" which causes the pilot to lose the control reaction or "feel" which is so necessary for successful operation of aircrafts.

It is, therefore, an object of this invention to provide a control system in which the control force will be confined closely to their point of origin. I prefer to accomplish this object by using a hydraulic control system in which all the booster mechanism, including fluid pressure pumps and fluid transmission lines, and the like, are confined closely to the control surface. This arrangement offers a further advantage in that it minimizes the vulnerability from a military standpoint.

The primary object of this invention, however, is to obtain a control reaction or "feel" through a substantially direct mechanical connection between the control surface and the manually operated control column and to utilize the manual force supplied by the pilot to the control column to govern the assisting force supplied by said booster control system. It will be apparent from the description of the preferred embodiments of this invention that this "feel" or "control reaction" is transmitted to the pilot in the same manner as it is in the other systems of control which do not utilize any boost or assisting device.

It is a further object of this invention to provide a control system in which the boosting force is governed solely by the manual force exerted by the operator on the control column and will be transmitted to the control surface in a determined ratio of the manually applied force.

It is also a further object of this invention to have the ratio of the total control forces to the manually applied force governed by the pilot.

It is a still further object of this invention to provide a fluid booster control system in which the reaction of the control surface is transmitted to the pilot with a high degree of fidelity and which does not impose additional loads to the manual operation of the control surface by the pilot when the booster control system is shut off or otherwise rendered inoperative.

It is another object of this invention to provide a fluid booster mechanism in which changes in fluid viscosity due to the variations in temperature will have a minimum lagging effect on the operator's load when the booster control is in use and which will have no effect whatsoever upon the operator's load when booster control is not in use.

It is another object of this invention to provide the hydraulic servo-motor utilized for supplying a booster force to aid in positioning the control surface of an aircraft with a fluid actuated valve the operation of which permits a pressure neutralization between the two sides of a power piston, and balances this pressure to that of the existing altitude. This valve also permits trapped air to escape and provides a return passage for the fluid vented by said hydraulic servo-motor when applied to a selected side of said piston.

It is to be understood therefore that in its preferred embodiment, this invention performs the function of assisting a pilot in moving the control surface of an aircraft against the reaction offered by its flight sustaining medium and also assists in resisting movement of the control surface by loads imposed thereon by said flight sustaining medium. I propose to obtain the assistance by means of fluid pressure the flow of which is controlled by the manual force applied by the operator to the control surface and in such a manner that the muscular effort required of the operator will be only a selected portion of the total load. I prefer to accomplish this result by providing a substantially direct mechanical connection between the control surface of the aircraft and the pilot's control stick similar to the ordinary systems of control. The use of the direct mechanical connection permits the apparatus to function in a manner such that any change in reaction of the control surface will be transmitted to the operator through the mechanical connection and will be felt by the operator as a change in muscular effort in the selected ratio of manual to control force.

Other objects and advantages will become apparent from the specification as specific features of certain preferred embodiments of this invention are hereinafter described in detail in connection with the accompanying drawings, in which Fig. 1 is a schematic view of the control mechanism of this invention employed for positioning a control surface of an aircraft, the control surface being governed in response to the manual pressure applied to a manually operated control stick;

Fig. 2 is a detailed view of the braking mechanism illustrated diagrammatically in Figs. 1 and 3;

Figure 3:
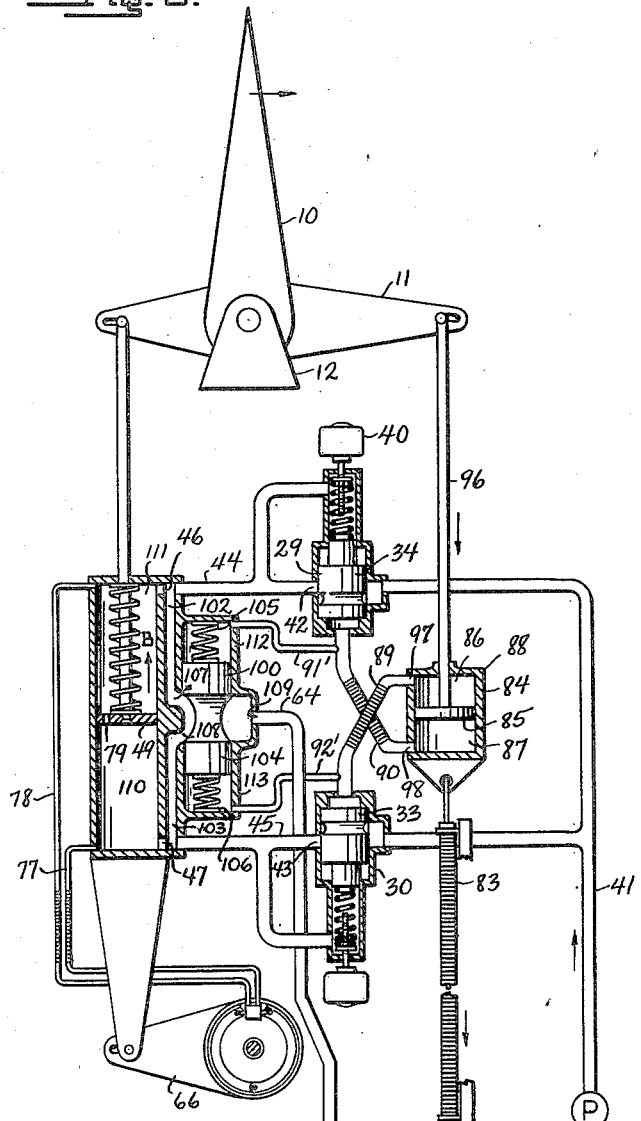
Fig. 3 is a schematic view of a modification illustrating a push-pull system of control of a hydraulic motor for positioning the control surface of an aircraft, the control mechanism as illustrated being governed by the manual pressure applied to the manual control stick.

Referring to Fig. 1 of the drawings wherein a preferred embodiment of this invention is diagrammatically illustrated as applied to aircraft control systems, reference numeral 10 designates a control surface such as an aileron, elevator, or rudder pivoted to its supporting structure 12. This control surface 10 is positioned about its pivot by the application of a torque to the control horn 11 which is secured to the control surface in the manner well known to the art.

The cables 13 and 14 provide a means for applying the torque to the control horn and have an end of each secured to the control horn at opposite sides of its pivot. The other ends of the cables 13 and 14 are secured to their corresponding pistons 15 and 16 of the fluid couplings which I have designated at 17 and 18 on the drawings. Each of these fluid couplings 17 and 18 includes in addition to its movable piston 15 and 16 an enclosing cylinder 19 and 20 which forms a fluid-tight chamber about its respective piston. The control cables 21 and 22 have an end secured to each of these cylinders 19 and 20 with the other end of each secured to the free ends of a pivoted spreader bar 23. A pivoted control stick 24 is connected by means of cables 25 and 26 to the opposite ends of the spreader bar 23 so that any initial "rigging" tension may be applied to these control cables 25 and 26 without effecting the fluid pressure within the fluid couplings 17 and 18 since the tensional force within these cables is transmitted to the spreader bar 23 and tends only to deflect this bar about its pivoted support.

A suitable low viscous fluid such as kerosene or alcohol is contained within each of the fluid couplings 17 and 18 between the pistons 15 and 16 and the cylinders 19 and 20 so that the force manually applied to the control stick 24 will be transmitted to the fluid retained within said fluid couplings 17 and 18. Flexible pressure hose 27 and 28 connect the interior of each of these fluid couplings respectively to the pressure regulating valves indicated generally on the drawings as 29 and 30 and transmit the fluid pressure developed therein to the top surface of the piston-like closure members 33 and 34 thereof. Each of these regulating valves has a cylindrical housing 31 and 32 enclosing its respective piston-like valve closure members 33 or 34 in a fluid tight chamber.

The valve closure members 33 and 34 are retained in the position illustrated in the drawings by means of the coiled springs 37 and 38. In their illustrated position these valve closure members block the outlet passages 42 and 43 formed within the cylindrical housings 31 and 32 respectively.

As shown, suitable electrical motors 39 and 40 are provided for each pressure regulating valve to control the tension of the coil springs 37 and 38 by moving an abutting collar 5 transversely of the threaded supporting shaft 6 in accordance with rotation of this shaft by its respective motor. The pressure transmitted from the fluid couplings 17 and 18 by means of a flexible hose 27 and 28 to each of the pressure regulating valves 29 and 30 is also transmitted by means of fluid conduits 91 and 92 to opposite sides of the valve piston 82 of the vent valve 81. Fluid is delivered under pressure by means of the pump P from the fluid supply tank 99 to each of the inlet passages 35 and 36 of the control valves 29 and 30 by means of the fluid pressure line 41. The closure members 33 and 34 of the fluid control valves 29 and 30 each have a centrally formed groove 3 by means of which fluid applied to inlet passages is transmitted peripherally to the interior of the cylindrical housings 31—32 and to the outlet orifices 42 and 43 formed therein.

Fluid conductive passages 44 and 45 connect each of the outlet passages 42 and 43 to the input orifices 46 and 47 positioned at opposite ends of the power cylinder 48. Conduits 94 and 95 connect each of the fluid conductive passages 44 and 45 to the cylindrical housings 31 and 32 of the control valves 29 and 30 so as to admit fluid pressure within the fluid conductive passages 44 and 45 to the end surfaces of the cylindrical closure members 33 and 34 opposite the end surfaces to which the fluid pressure of the fluid coupling members 17 and 18 is applied. Thus the total manual force applied to the fluid coupling must be greater than the total resultant force of the spring and fluid pressure acting on the end surface of the pistons 33 and 34. The fluid pressure as controlled by the valves 29 and 30 will be transmitted to the opposite sides of a power piston 49 movably mounted within said power cylinder 48 and rigidly connected to the control horn 11 by means of the pivoted control rod 50. This piston member 49 is centrally positioned when no fluid pressure is applied thereto with respect to the power cylinder 48 by means of tension and compression spring 51. Outlet passages 52 and 53 are formed within said power cylinder 48 at a position which, as illustrated, is substantially diametrically opposite the fluid entrance passages 46 and 47 respectively. Fluid conductive passages 54 and 55 connect each of the outlet passages 52 and 53 to opposite ends of a fluid pressure operated cylindrical vent valve 56 so that the pressure applied to each outlet passages 52 and 53 will be applied also to the movable piston-like valve closure member 57 which is centrally positioned within the fluid pressure operated cylinder valve 56 by means of coil springs 58 and 59.

This fluid pressure operated cylinder vent valve 56 has two inlet passages 60 and 61 which are each connected by the fluid conductive pipe 62 and 63 to the fluid conductive pipes 54 and 55 leading from the outlet passages 52 and 53 respectively. Fluid conductive pipe 64 connects the outlet 65 of the vent valve 56 to the sump or supply tank 99 which is positioned in the return line or low pressure side of the fluid supply system and is provided with a vent to atmosphere as is well known in the art. The piston 49 has a small hole 79 formed therein which permits the actuating fluid pressure to diminish as it vents to the opposite side of the piston and returns to the sump or supply tank 99.

The effect of venting a portion of the actuating fluid pressure is that it requires the pilot to apply a constant pressure to the control stick 24 in order to maintain a determinable control surface position. It also permits the pilot to allow the control surface to move to a position wherein its angle of deflection is reduced merely by applying a decreased effort on to the control stick 24. The effort which the pilot must maintain is dependent upon the size of the vent. The air stream always tends to return a control surface to its neutral position if the control force on the control stick is at all diminished, and it is important to the pilot that the force applied to this control stick be increased or decreased more or less uniformly with the control surface deflection.

Figure 4:
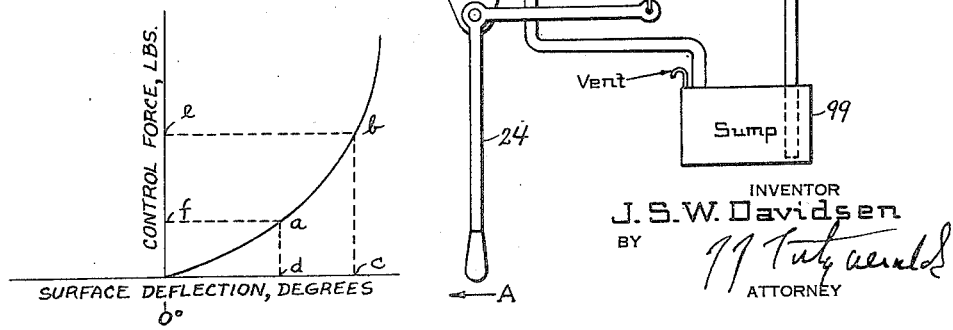
Fig. 4 is a plot of a typical control force curve, wherein stick force is plotted against control surface deflection.

In Fig. 4, I have shown a typical control force curve which illustrates the variations in control stick force with control surface deflection. Assuming the control surface has been moved from position $a$ to position $b$ by the application of a suitable manual effort to the control stick represented by a force $fe$, and assuming further that the pilot wishes to reduce the pressure on the control stick permitting the control surface to move back to the position $a$, it is only necessary for the pilot to reduce the pressure applied to the control stick by an amount indicated on the control force curve at $ef$.

If it were not for the fact that the fluid applied to the power cylinder 48 were being constantly vented to the return line by the aperture 79, the pilot would be required in moving the control surface from the position $b$ to $a$ to return to the position of zero deflection wherein the valve 56 would open the passage 62 to permit fluid in the power cylinder to escape to the return line 64. The pilot would then be required to again apply a manual pressure to the control stick equal to the manual pressure indicated at $f$ in Fig. 4 to require the control surface to come to position $a$. It is thus apparent that the pilot would be required to reverse the control force while the control surface force is merely diminished. In other words, without the vent a force change equal to $bc-da$ would be required for a change in control surface deflection equal to $dc$. This would result in an unsatisfactory condition for the pilot.

In order to avoid this unsatisfactory condition, the orifice 79 is provided in the piston 49 and permits some of the actuating fluid to flow through the piston 49 and back to the supply tank 99, thereby requiring the operator to exert a constant pressure on the control stick 24 to replenish the actuating fluid so that its action may maintain a given control surface position. If the pressure on the control stick is diminished at a rate corresponding to ordinary control surface movement, the control surface will assume a position of less deflection and no reversal of the manual force applied to the control stick will be involved.

As illustrated, the power cylinder 48 is supported by a triangular shaped member 66 which has an axially projecting rim 67 forming a brake drum overlying the brake lining 68 which is secured to the outer surface of the pivoted arcuate shaped brake shoes 69 and 70. These brake shoes 69 and 70 are shown pivoted at 71 while the free ends of each is secured to the pistons 72 and 73 respectively of the brake cylinder 74. A coiled spring 75 is secured to the free ends of each of the brake shoes 69 and 70 and retains these arcuate shaped shoes in the position illustrated wherein the surface of the brake lining 68 does not contact the inner surface of the brake drum 67. The support 66 is pivoted about a shaft 76 so that movement of the control horn 11 and the control surface 10 by means of the operator's control stick 24 will not be opposed by the fluid within the power cylinder 48 when boost is not used but will merely cause the power cylinder to turn about its pivot 76 and in this manner offer no interference with the direct application of the manual force applied by the pilot.

When using boost in order to lock the power cylinder in a position which will enable the force developed by the fluid pressure acting upon the piston to be delivered to the control horn 11, fluid pressure is also admitted to either side of the brake cylinder 74 so as to act on either of the pistons 72 or 73 moving one of the said pistons outwardly of the cylinder so that the arcuate shaped members 69 and 70 will be moved about their pivot 71. The brake lining 68 will thus be forced into a locking engagement with the inner surface of the drum 67. The drum will then be locked and will be unable to turn about its pivot 76.

Fluid conduits 77 and 78 which, as shown, have a flexible portion, connect differential sides of the double piston brake cylinder 74 with the discharging lines 44 and 45 leading from the outlet passages 42 and 43 of the pressure regulating valves 29 and 30 respectively. It is the general practice to have the brake cylinder 74 supported by the brake shoes 70—69 so that equal pressure will be simultaneously applied to each shoe. By-pass pipes 80' and 80 connect each of the fluid conduits 44 and 45 together through the cylindrical control valve 81. The piston 82 of the cylindrical control valve is operatively positioned within its housing by the pressure differential existing between the two fluid couplings 17 and 18. Since opposite ends of the cylindrical casing containing the piston 82 are connected respectively to flexible hose 27 and 28, the position of the piston 82 controls the fluid transmitted by the by-pass pipes 80' and 80 in accordance with the pressure differential between the fluid couplings 17 and 18. The purpose of the by-pass control valve is to neutralize any pressure differences that may be generated in the power cylinder 48. For example, the action of the coil spring 51 may cause unequal pressures to be developed in the chambers 111 and 110 when the operator's control stick 24 is in a neutral position and when the fluid pressure in the coupling members 17 and 18 is substantially equal.

Fig. 3 discloses a modification of this invention wherein a push-pull system of control is utilized and wherein a single valve 100 replaces in function both the valves 56 and 81 of the apparatus disclosed in Fig. 1. The system disclosed has a single control element 83 which is illustrated as the Bowden wire and which delivers the push-pull pressure transmitted by the operator to the control stick 24 on to the control horn 11 through the fluid coupling member 84. This fluid coupling member consists specifically of a centrally disposed piston 85 which is connected by means of the control rod 96 to the control horn 11. The cylinder 88 surrounds the piston 85 and forms therewith two fluid-tight chambers indicated on the drawings at 86 and 87. This cylinder 88 is secured to the control element 83 and transmits the push-pull forces applied to the control stick 24 to the fluid within the chambers 86 and 87 to the opposite sides of the piston 85 and on to the control surface 10. Flexible hose 89 and 90 connect the outlet passages 97 and 98 formed in the cylinder 88 at opposite sides of the piston 85 to the interior casing of each of the control valves 29 and 30 respectively. The discharge lines 44 and 45 leading from the outlets 42 and 43 formed within their respective control valves 29 and 30 are connected to the inlet orifices 46 and 47 of the power cylinder 48. These supply lines 44 and 45 also communicate by means of the by-pass indicated at 102, 107, 108 and 103. The valve piston 104 of the valve 113 is centrally positioned within the cylindrical housing 112 by means of the two coiled compressional spring members 105 and 106 which are positioned at each end of the valve piston. An outlet passage 109 is formed in the housing 112 and is connected to the return line 64 of the fluid supply system. The opposite end surfaces of the piston 104 are subjected to the pressure existing in the chambers 86 and 87 of the fluid coupling member 84 since the fluid conductive passages 91' and 92' connect opposite ends of the housing 112 to the flexible hose members 89 and 90. The remaining portions of the control system illustrated in Fig. 3 are identical with those illustrated in Fig. 1; consequently similar reference numerals have been used to designate corresponding parts.

It should be apparent from consideration of Fig. 3 that the function of the valve 81 of Fig. 1 is performed by the valve 113. It will be recalled that the function of the valve 81 is to permit the passage of fluid from one side of the piston 49 to the other side when the centering spring 51 was operating during the intervals when the booster force was not being used. This same function is performed by the passageways indicated at 102, 107, 108 and 103 of Fig. 3. The valve piston 104 operates to close this by-pass blocking either of the ports 107 or 108 when the piston 104 moves upwardly or downwardly in response to unequal pressures acting upon the end surfaces thereof when differential pressure exists in the conduits 91' and 92'. The function of valve 56 of Fig. 1 was to permit the escape to the sump of fluid on one side of the piston when the fluid pressure was applied to its opposite side. Valve 113 also performs this function in the following manner.

In Fig. 3 when the control stick 24 is moved in the direction A, the pressure generated in the compartment 86 of the fluid coupling 84 is transmitted through the fluid conductive passages 89 and 92' to the top of the casing 113 applying pressure to the end surface of the valve piston 104 at which the centering spring 106 is located. The valve piston 104 will move upwardly as a result of this pressure a distance sufficient to close the passageway 108, thus cutting off the by-pass connection. The passageways 102 and 107 leading to the outlet 109 and to the sump 64 are not closed by the piston 104. The fluid or entrapped air on the side 111 of the piston may thus escape to the sump when the actuating pressure of the supply line 43 is applied to the side 110 of the piston 49. The valve 113 therefore performs the function of both the valves 81 and 56 of the modification shown in Fig. 1 resulting in a net elimination of one valve from the hydraulic circuit disclosed therein.

The operation of the system illustrated in Fig. 1 is as follows:

If the operator wishes to move the control surface 10 to a position indicated by the broken lines, pressure is applied to the operator's control stick 24 in a direction indicated by the arrow A. This pressure increases the tension in the cable 25 which is transmitted to the cable 21 and increases the fluid pressure within the fluid coupling 17. This increase in fluid pressure within the coupling 17 is in turn transmitted to the piston 15 through the cable 13 and on to the control horn 11 and tends to actuate the control surface 10. The increase in fluid pressure within the fluid coupling 17 is applied to the top surface of the valve closure member 33 and exerts a pressure thereon tending to move the closure member 33 downwardly of the cylindrical housing 31 against the action of the spring 37. If the fluid pressure applied to the closure member 33 is sufficient to move this closure member against the expansive force of the coil spring 37, the fluid pressure transmitted from the supply source by means of the conduit 41 will be admitted by the pressure regulating valve 29 into the power cylinder 48 through the fluid conduit 44. The fluid pressure admitted into the power cylinder acts on the upper surface of the piston 49 tending to move the piston in the direction indicated by the arrow B against the force of the coil spring 51 and the reaction offered by the control surface 10. In order that the operator or pilot may control the ratio of the force transmitted directly to the control surface 10 by means of the cables 13 and 14 to the amount of assisting force transmitted by the power cylinder 48, an electric motor 39 is provided which when energized will control the initial compression applied to the coil spring 37. The initial compression applied to the spring 37 controls the amount of initial pilot pressure that is required to displace the closure member 33 a distance sufficient to allow fluid pressure from the supply source to enter the fluid conductive supply line 44.

It should also be noted that the fluid pressure from the supply source transmitted by the regulating valve 31 into the fluid supply conduit 44 is also applied by means of the fluid conductive passageway 94 to the end surface of the closure member 33 opposite the end surface to which the fluid pressure within the fluid coupling member 17 is applied. This results in the transmission to the fluid coupling 17 of a force proportional to the fluid pressure existing on the side 111 of the piston 49 and permits the operator to feel in a determinable ratio the force reacting upon the control surface.

Conduits 91 and 92 transmit the fluid pressure existing in the couplings 17 and 18 to the opposite ends of the piston-like valve member 82 of the by-pass valve 81. The differential pressure existing in the fluid couplings act to close the passageway connecting the by-pass pipes 80' and 80. The fluid pressure at the outlet 42 of the pressure regulating valve 29 passes along the supply conduit 44 to the conduit 77 leading therefrom and is transmitted to the side of the brake cylinder 74 containing the piston 72 causing the fluid pressure acting upon the movable piston to expand the brake lining 68 into locking frictional engagement with the brake drum 67. The supporting arm 66 is thus locked in a fixed position relative to its pivot 76. The conductive passage 54 leading from the outlet 52 of the power cylinder 58 transmits the fluid pressure contained within the chamber 111 of the power cylinder to the end surface of the piston 57 of the cylindrical vent valve 56 moving the piston 57 to a position wherein the inlet 61 of the valve 56 will be connected to the outlet passage 65. This permits the fluid on the underside of the piston 49 or in the chamber 110 to escape by means of the conduit 64 to the sump or fluid supply tank 99. When the piston 57 is in the position wherein the passageway 63 is connected to 64, the inlet 60 of the valve 56 is blocked or cut off thereby preventing escape of the fluid in the upper portion of the power cylinder 48 and an assisting power is transmitted to the control surface 10.

Movement of the control surface which results from the assisting and manual forces to the position indicated by broken lines will result in a decrease in tension on cables 13 and a decrease in the pressure of the fluid contained within the coupling member 17, thus allowing the closure member 33 of the regulating valve 29 to reassume a position closing the entrance passage 35. If it is desired to move the control surface in the opposite direction the same cycle of operation applies except that it involves the fluid coupling 18 and the pressure regulating valve 30.

The function of the braking surface 68 is to lock the supporting arms 66 to the brake shoes 69 and 70 when a booster force is being supplied by the power cylinder so that the piston 49 may exert its booster force tending to move the control surface 10 in a desired direction. When a booster force is not desired or in the event it should fail the cylinder and piston assembly are free to move about the pivot 76 and in this manner offer no interference with the application of the operator's manual control force.

It should be noted that in the illustrated embodiment the coil spring 51 of the power cylinder is fastened to the piston 49 and to the cylinder 48 in such a manner as to act both as a compression and tension spring depending upon the direction of movement of the piston 49. The spring thus serves to keep the piston 49 at the center of the cylinder 48 so that in the intervals when the booster force is not being used the brake cylinder 74 will not be maintained under fluid pressure. The piston is also thus maintained in a position whereby it is capable of delivering a full power stroke tending to position the control surface in either direction.

The function of the separator bar 23 is to permit any initial "rigging tension" to be placed on the control cables 25 and 26 without interfering with the tensional stress in the control cables 21 and 22 or with the fluid pressure within the fluid coupling members 17 and 18.

In the embodiment illustrated in Figs. 1 and 3, flexible hose connections are provided in the supply lines 77 and 78 leading from the pressure regulating valve 29 and 30 respectively. In the preferred embodiment, all of the apparatus except the fluid couplings 17 and 18 are made integral with the main cylinder 48 and connections 77 and 78 to the brake cylinder 74 must therefore contain the flexible connecting member.

While I have disclosed fluid couplings of the piston and cylinder type, I wish it understood that either this type or the diaphragm type of fluid coupling may be used with equal success. It should also be understood that I propose to enclose these fluid couplings disclosed between diaphragms in order to eliminate the possibility of any fluid leakage therein.

The operation of the modification illustrated in Fig. 3 is substantially identical with that illustrated in Fig. 1 except for the fact that a single fluid coupling member and a single valve member replace in function both couplings and both of the valves 81 and 56 of Fig. 1. When the operator or pilot applies pressure to the operator's control stick 24 in the direction indicated by the arrow A of Fig. 3 the force applied will be transmitted by means of the Bowden wire 83 to the cylinder 88 tending to move this cylinder in the direction indicated and transmitting the applied force to the fluid retained between the upper surfaces of the piston 85 and the chamber 86. Since the fluid contained within the chamber 86 is substantially uncompressible, the force applied to the cylinder 88 will be transmitted undiminished to the end surface of the piston 33 of the control valve 30 by means of the flexible conduit 89. Similarly, the fluid pressure within the chamber 87 will be applied to the end surface of the piston 34 of the control valve 29 by means of the flexible conduit 90. The manual force applied to the control stick 24 will also be transmitted through the fluid within the coupling to the control horn 11. The cycle of operation remaining is similar in all respects to that described in connection with Fig. 1 except for the action of valve 113 which has been set out above.

According to the provisions of the patent statutes, the preferred forms of my invention have been illustrated and described with the understanding that certain modifications may be made and that the invention may be practiced otherwise than specifically disclosed and still remain within the scope of the appended claims.

The invention described herein may be manufactured and used by or for the Government of the United States of America for governmental purposes without the payment of any royalties thereon or therefor.

Having now fully described my invention, what I claim is:

1. In a fluid servo-motor system for supplying a force to a pivoted control surface of an aircraft assisting the force applied through a manually operable means, the combination comprising a fluid motor for supplying said assisting force, a fluid supply source for actuating said motor, a sealed fluid coupling the fluid in which is independent of that from said supply source, means connecting said manually operable means to said control surface through said fluid coupling whereby a force applied to said manually operable means will produce a pressure in said fluid coupling, valve means responsive to the fluid pressure in said coupling when the force applied to said manually operable means is in one direction to supply fluid from said supply source to said motor to produce said assisting force in such direction, valve means responsive to the fluid pressure in said coupling when the force applied to said manually operable means is in an opposite direction to supply fluid from said source to said motor to produce said assisting force in an opposite direction, and means providing independent adjustment of the manual force necessary to operate each of said valve means whereby the manual force may be set to any desired fraction of the assisting force in either direction of movement of said control surface.

2. In a fluid servo-motor system for supplying a force to a pivoted control surface of an aircraft assisting the force applied thereto through manually operable means, the combination comprising, a power cylinder having a movable piston secured to said control surface to supply said assisting force thereto, a support for said power cylinder, said support being pivoted about an axis, means pivoting said cylinder to said support to permit the cylinder and piston assembly to move with the control surface when controlled only by said manually operable means, and means for locking the support in fixed position relative to its pivot so that the fluid forces acting on said piston may be transmitted to said control surface when assisting force is desired.

3. The combination defined in claim 2 characterized by the fact that said support includes a brake drum rotatable about a seizing surface, and said last named means includes a brake cylinder, piston and fluid transmitting means for admitting fluid to said cylinder expanding said seizing surface against said drum.

4. In a fluid servo-motor system for operating a pivoted control surface of an aircraft, the combination comprising, fluid pressure operated means for moving said control surface in either direction about its pivot, manual means for moving said control surface in either direction about its pivot in the event said fluid pressure operated means fails or is not desired, a pivoted supporting member, means securing said fluid pressure operated means to said pivoted supporting member, and means responsive to the fluid pressure admitted to said fluid pressure operated means for preventing movement of said supporting member about its pivot.

5. The combination defined by claim 4 characterized by the fact that said pivoted supporting member includes a brake drum rotatable about a fixed seizing surface, and said last named means includes a brake cylinder, piston and fluid transmitting means for admitting fluid to said cylinder expanding said seizing surface against said drum.

6. In a system for supplying an assisting force to aid in positioning the control surface of an aircraft, the combination of a manually operable means for transmitting a manual force directly to said control surface, said means including fluid coupling means, a supply source of fluid under pressure having a fluid return line therefor, a power cylinder having a piston movable therein supplying force assisting the manual force in positioning said control surface when a fluid pressure is applied at either side thereof, fluid pressure actuated valve means operated by the fluid pressure of said coupling means for controlling the flow of fluid from said supply source to a selected side of the piston in said power cylinder, said power cylinder having an escape passage leading therefrom at opposite sides of said piston, and valve means for closing the escape passage leading from said selected side of said piston and connecting the escape passage leading from the opposite side of said piston to said return line, said piston having an opening formed therein permitting the fluid pressure acting thereon to vent to the return line through the escape passage leading from said cylinder at the opposite side of said piston whereby the operator is required to apply a constant manual force to said manually operable means to maintain said control surface in a determinable position.

7. In a system for supplying an assisting force to aid in positioning the control surface of an aircraft, the combination of a manually operable means for transmitting a manual force directly to said control surface, a supply source of fluid under pressure having a fluid return line therefor, a power cylinder having a piston movable therein for supplying a force assisting said manual force in moving said control surface when a pressure fluid is applied at either side thereof, a first valve means operated by the manual force applied to said first named means for selectively controlling the flow of fluid from said supply source to said power cylinder on either side of said piston, escape ports leading from said cylinder on opposite sides of said piston, a second valve means interconnecting said escape ports to said return line, fluid pressure conduit means connected to said second valve means for operating said second valve means to close the escape port leading from the cylinder at the side of said piston to which fluid pressure is applied, said piston having an opening formed therein permitting the fluid pressure acting thereon to vent to the return line through the escape port leading from said cylinder at the opposite side of said piston, whereby the operator is required to apply a constant manual pressure to said manually operable means to maintain said control surface in a determinable position.

8. In a system for supplying an assisting force to aid in positioning the control surface of an aircraft, the combination of a manually operable means for applying a manual force directly to said control surface, fluid coupling means interposed between said control surface and said manually operable means whereby a force when applied to said manually operable means will increase the pressure in said fluid coupling means, a supply source of fluid under pressure, fluid pressure operated means for supplying a force assisting said manual force in moving said control surface, fluid pressure actuated valve means for controlling the supply of fluid from said source to said fluid pressure operated means, and a fluid conduit connecting said fluid coupling to said valve means whereby said valve means will be actuated when pressure is increased in said fluid coupling means, said fluid pressure operated means having means for venting a portion of the actuating fluid admitted thereto whereby to require the application of a constant manual pressure to said manually operable means to maintain said control surface in a determinable displaced position.

9. In a system for supplying an assisting force to aid in positioning the control surface of an aircraft, the combination of a manually operable means for transmitting a manual force directly to said control surface, a fluid pressure operated means for transmitting a force assisting said manual force in moving said control surface, a supply source of fluid under pressure, conduit means connecting said fluid pressure operated means to said fluid supply source, valve means controlled by the manual force applied to said manually operable means, said valve means being interposed in said conduit means for governing the admission of fluid from said supply source to said fluid pressure operated means, and means for venting a portion of the actuating fluid applied to said fluid pressure operated means, thereby requiring the application of a constant manual force to said manually operable means to maintain said control surface in a determinable displaced position.

10. In a hydraulic servo-motor for supplying a booster force to aid in positioning the control surface of an aircraft, the combination of a power cylinder having a piston movable therein, a first fluid pressure actuated valve means for controlling the admission of fluid under pressure to opposite sides of said piston, a by-pass connecting opposite ends of said cylinder for neutralizing any fluid pressure differences existing on opposite sides of said piston, and a second fluid pressure actuated valve means for controlling said by-pass, said second valve means being operated by the fluid pressure actuating said first valve means, whereby said by-pass will be closed when fluid under pressure is admitted to said power cylinder.

11. In a hydraulic servo-motor for supplying a boost force to aid in positioning the control surface of an aircraft, the combination including a power cylinder having a piston movable therein, a supply source of fluid under pressure, separate conduit means for conducting fluid from said supply source to opposite sides of said piston, fluid pressure actuated valve means in each of said conduits for controlling the flow of fluid therein, a double acting valve comprising a cylinder having a medially positioned outlet passage leading to a return line in said supply source, escape conduits leading from opposite ends of said power cylinder into communication at said centrally formed passage thereby forming a by-pass connection for said power cylinder to neutralize any fluid pressure difference existing on opposite sides of said power piston, a valve piston yieldably retained in a position in said cylinder whereby said escape passages communicate, conduit means admitting the fluid pressure actuating the valve controlling the flow of fluid to one side of said power piston to the end of said valve casing wherein the fluid pressure acting on said valve piston will tend to cause movement in a direction closing the escape passage leading from the said side of said power piston, and conduit means admitting the fluid pressure actuating the valve controlling the flow of fluid to the other side of said power piston to the other end of said valve casing, whereby the escape passage leading from the end of said power cylinder to which fluid under pressure is admitted will be closed but the escape passage leading from the other end of said power cylinder will communicate with the medially positioned outlet passage.

12. In a hydraulic servo-motor for supplying a boost force to aid in positioning the control surface of an aircraft, the combination including a cylinder having a piston movable therein, a supply source of fluid under pressure, separate conduit means for conducting fluid from said supply source under pressure to said cylinder at opposite sides of said piston, fluid pressure actuated valve means in each of said conduits for controlling the flow of fluid therein, a double acting valve comprising a cylinder having a centrally formed outlet passage leading to a return line in said source of fluid supply, escape conduits leading from opposite ends of said power cylinder into communication at said centrally formed passage, thereby forming a by-pass connection for said power cylinder to neutralize any fluid pressure difference existing on opposite sides of said piston, a valve closure piston yieldably retained in an initial position in said valve cylinder whereby said passages communicate, and conduit means admitting the fluid pressure actuating the valve controlling the flow of fluid to one side of said piston to the end of said valve casing tending to cause said valve closure piston to move in a direction closing the passage leading from the side of said piston to which pressure fluid is admitted, the movement of said piston being limited so that said outlet leading from the cylinder at the other side of said piston will remain in conductive communication with the centrally formed exit passage leading from said valve to provide an escape for fluid from the other side of said piston.

13. In a system for supplying a force assisting that derived from manually operated means to position a control surface of a craft against the reaction offered by the medium within which the craft is operated, the combination comprising, a servo-motor, means connecting said motor to position said control surface, a supply source of fluid under pressure for actuating said motor, a sealed fluid coupling, means connecting said manually operated means to said control surface through said fluid coupling whereby the manually applied force is transmitted to said control surface by the increase in pressure in said coupling, and means responsive to the change in fluid pressure in said coupling for controlling the flow of fluid from said supply source to said motor.

14. In a system for supplying a force assisting that derived from manually operated means to position a control surface of a craft against the reaction offered by the medium within which the craft is operated, the combination comprising, a servo-motor, means connecting said motor to position said control surface, a supply source of fluid under pressure for actuating said motor, a sealed fluid coupling, means connecting said manually operated means to said control surface through said fluid coupling whereby the manually applied force is transmitted to said control surface by the increase in pressure in said coupling, a fluid pressure operated valve responsive to the increase in pressure in said coupling for controlling the flow of fluid from said supply source to said motor, and means for applying the pressure of the fluid from said supply source to oppose operation of said valve.

15. In a system for supplying a force assisting that derived from manually operated means to position a control surface of a craft against the reaction offered by the medium within which the craft operates, the combination comprising, a servo-motor, means connecting said servo-motor to position said control surface, a supply source of fluid under pressure for actuating said motor, a sealed fluid coupling, means connecting said manually operated means to said control surface through said fluid coupling whereby the manually applied force is transmitted to said control surface by the increase in pressure in said coupling, a fluid pressure operated valve openable in response to the increase in pressure in said coupling for controlling the flow of fluid from said supply source to said motor, and means biasing said valve to a closed position.

16. The combination in claim 15 and further including means for adjusting the force exerted by said biasing means whereby the manual force applied may be adjusted to any desired fraction of the assisting force.

17. In a system for supplying a force assisting that derived from manually operated means to position a control surface of a craft against the reaction offered by the medium within which the craft operates, the combination comprising, a servo-motor, means connecting said motor to position said control surface, a supply source of fluid under pressure for actuating said motor, a sealed fluid coupling, means connecting said manually operated means to said control surface through said fluid coupling whereby the manually applied force is transmitted to said control surface by the increase in pressure in said coupling, a fluid pressure operated valve openable in response to the increase in pressure in said coupling for controlling the flow of fluid from said supply source to said motor, means biasing said valve to a closed position, and means for applying the pressure of the fluid from said supply source when said valve opens to also urge said valve to a closed position.

18. In a system for supplying a booster force to that derived from a manually actuated means in positioning an aircraft control surface, the combination comprising means connecting said manually actuated means to said control surface, a sealed fluid coupling interposed in said connecting means, a fluid pressure supply source, a fluid motor connected to said control surface for supplying said booster force, a pivoted support for said motor, conduit means between said source and motor, fluid pressure actuated valve means interposed in said conduit means, second conduit means connecting said fluid coupling with said valve means to actuate the latter, and fluid operated means responsive to fluid pressure admitted to said motor for locking said motor support to prevent its movement about said pivot only during the time that said motor is supplying said booster force whereby said motor will be freely movable about its pivoted support when said booster force is not in use.

JESS S. W. DAVIDSEN.